Patented Mar. 13, 1951

2,544,694

UNITED STATES PATENT OFFICE 2,544,694

PROCESS FOR MAKING ULTRAMARINE

Charles A. Kumins, Tuckahoe, N. Y., assignor to Interchemical Corporation, New York, N. Y., a corporation of Ohio No Drawing. Application October 8, 1947,
Serial No. 778,730

11 Claims. (Cl. 106—305)

This invention relates to ultramarine blue and aims to provide a new and economical method for its production.

Ultramarine blue is a sulfur containing sodium aluminum silicate having a crystal structure closely resembling that of the zeolites. The blue color is attributed to the presence of sulfur complexes in the crystal lattice. It is widely used as a blue pigment in paints, inks, paper, etc.

Ultramarine blue is produced commercially by calcining, under various conditions and in various types of apparatus, an intimate mixture of china clay with about an equal weight of sodium carbonate and/or sodium sulfate and sulfur and with a small amount of carbonaceous material such as pitch, rosin or charcoal. A small amount of silica is also sometimes included in the mixture. The ingredients and proportions are often varied in order to obtain products having different properties. For example, when sodium sulfate with no sodium carbonate is used, a weak, greenish product which is low in hiding power and poor in acid resistance is obtained, and when sodium carbonate with no sodium sulfate is used, together with some silica and a high percentage of sulfur, a dark, reddish-blue product with improved hiding power and acid resistance is obtained.

In one method the mixture is calcined, with exclusion of air, in covered, cylindrical or tapered fireclay or other refractory crucibles placed one upon another in a muffle or shaft furnace, for from 7 to 10 hours, at a temperature "between red and white heat." This operation produces a green ultramarine. The exact weight and temperature of the calcination depend upon the ingredients and the proportions of ingredients, the size and shape of the crucibles, the dimensions of the furnace, etc. At the end of the calcination the furnace is allowed to cool, which process generally takes from 2 to 3 days. The crucibles are then removed and the fused ultramarine green is crushed and drymilled in revolving barrels, ball mills, cone mills or pulverizers, etc., and screened to remove coarse particles. The ultramarine green is then intimately mixed with from about 7% to 10% of finely ground sulfur and roasted at "at medium red to a bright red heat" in a muffle, retort, cylindrical or other type furnace. The sulfur, instead of being preliminarily mixed with the ultramarine green, may be added intermittently during the roasting operation. It melts and burns as air is admitted, sulfur dioxide is formed and escapes, and the green color gradually changes to blue. The roasting operation takes 2 to 3 days or longer. The roasted blue product is finally lixiviated to remove soluble salts, wet-milled, dried and dry-milled.

In another method, often called the direct process, the mixture is calcined, with some admission of air, either in covered crucibles or pots, placed one upon another in a muffle furnace, or simply spread upon the floor of the muffle. When operating according to this method the furnace is slowly heated to about 800° C. and maintained at this temperature until a withdrawn test sample indicates that the operation is finished. The furnace is then closed and allowed to cool. The heating period usualy extends over from 24 to 36 hours and the cooling period usually extends over from 6 to 8 days.

These methods have certain inherent disadvantages. They are very time-consuming, often requiring from 10 to 14 days, or longer, to obtain the finished product, and they are difficult to control. They result in the formation of hard, fused masses. In both methods the process includes the formation of a zeolite by fusing china clay with sodium carbonate and/or sodium sulfate, the simultaneous formation of sodium polysulfide by reaction of sulfur and sodium carbonate and/or sodium sulfate under reducing conditions, and the simultaneous reaction of the zeolite with polysulfide. At this high temperature of formation of zeolite the structure is compacted and less susceptible to the entrance of the rather large polysulfide linkage into the crystal lattice. The polysulfide formation reaction is an equilibrium one and excess sulfur is required for the formation of the desirable higher polysulfides, $Na_2S_3$, $Na_2S_4$ etc. Under the high temperature conditions of the operation required for the reduction of sodium carbonate and/or sodium sulfate, these higher sulfur content polysulfides may not form, due to the loss of sulfur by volatilization. It is believed that the intensity of blue color and tinting strength of the pigment depend at least in part upon the amount of sulfur carried into the crystal lattice by the sodium, and that therefore the formation of higher polysulfides is extremely important.

It has already been proposed to substitute for china clay in the foregoing process a zeolite; this however, may or may not afford an advantage; if an artificial zeolite is employed instead of china clay, the raw material costs are materially increased, while if a natural zeolite is employed, the process has the disadvantage of operating with a raw material of variable composition leading to products which are similarly of variable quality.

I have discovered that a superior product of consistent quality may be obtained by the use of sodium aluminate and silica along with sulfur and a reducing agent such as pitch or rosin and a sodium salt such as sodium carbonate. I prefer to heat an intimate mixture of these substances in the absence of oxidizing conditions at a temperature above 600° C. preferably from 750° C. to 900° C. over a period of from twenty minutes to three hours, preferably allowing it to cool to from about 450° C. to 600° C. and oxidizing at this temperature with a slow admission of an oxidizing agent such as air and/or sulfur dioxide or nitric oxide during a period of about 0.5 to 3 hours. The resultant product is removed from the furnace, washed and ground.

Instead of sodium carbonate and pitch, materials that have been used in ultramarine reactions for many years, I may and generally prefer to use sodium sulfide or an alkali metal organic salt such as sodium acetate, sodium oxalate, sodium citrate or sodium propionate. In general, the ratio of carbon to sodium should be relatively low. The other sodium compounds that decompose at or below temperatures of the order of the boiling point of sulfur such as organic compounds where the ratio of carbon to sodium is relatively higher, such as the sodium salts of long chain fatty acids, can be used instead provided sufficient excess sulfur is present to combine with the carbon set free in the decomposition of the salt to form carbon disulfide which passes out of the reaction zone. I believe that the use of organic sodium salts controls excess alkalinity at all stages of the reaction such as occurs in the known process in which sodium carbonate is used. The sodium compound decomposes at about or below the boiling point of sulfur and during decomposition, the sodium combines with the sulfur to form extremely small sodium polysulfide particles in intimate association with the aluminate-silica compound.

It will be noted that I prefer to operate with a relatively lower oxidation temperature than that which is generally the practice in the known process. It is known that the conversion of ultramarine blue is accompanied by the removal of sodium oxide as sodium sulfate. It is also known that sulfur dioxide is oxidized most efficiently at a temperature of about 400° C. to 500° C. Apparently it has not heretofore been known that a superior product particularly in tinting strength can be obtained by converting ultramarine green to ultramarine blue at the relatively low temperature which I use. It is my belief that the sodium sulfate is formed by the reaction of sulfur trioxide with that part of the sodium oxide which is held rather loosely on the surface of the crystal lattice, and that this sodium sulfate formation and the accompanying oxidation of green ultramarine to ultramarine blue take place most readily at the temperature most suitable for the oxidation of sulfur dioxide to sulfur trioxide, at which temperature the sulfur trioxide concentration is highest.

My calcination process may be carried out in various ways and in various types of equipment. I may employ covered crucibles in muffle furnaces, I may spread the material on the floor of a muffle furnace, or I may use a batch rotary kiln or continuous type rotary kilns. If desired, the greenish product may be quenched in water, washed and dried before the oxidation calcination, or it may be, and preferably is, oxidized without removing from the furnace.

It may also be advantageous to add a small amount of a polar-non-polar compound such as a sodium soap of a material such as a fatty acid, rosin or lignin sulfonic acid during the mixing of the dry materials. This small addition prevents packing and also facilitates obtaining a uniform mixture of the ingredients. Obviously, if a sodium salt of a fatty acid is employed as the decomposable solid mentioned above, it serves a double purpose.

In the use of mixtures of sodium aluminate and silica I find that best results can be obtained by a careful control of the proportions of contained alumina and silica. I have found that for best results the ratios of silica to alumina on a molecular basis should range from about 2.00 to 3.00. Ratios within this range produce consistently good ultramarine blue, while the best blues are obtained between 2.40 and 2.80. I have found that raw materials of the ordinary commercial variety are generally satisfactory but if the iron content of the silica is excessive, there is a tendency towards discoloration. However, I find that washing the silica with hot sulfuric acid reduces the iron content to a satisfactory level.

Other alkali and alkaline-earth metals may be substituted for sodium in the process set forth. While the sodium salts generally produce at least as good product as any of the other metal salts as well as being the cheapest, acceptable colors can be produced with any of the indicated metal salts.

Examples of my process follow:

Example 1

A mixture is made which contains:

20.6 pounds silica
26.9 pounds sodium aluminate (90% grade)
15 pounds anhydrous sodium acetate
1.5 pounds tall oil soap
78 pounds sulfur by tumbling in a porcelain mill for a 3 hour period. The resulting powder is then charged into a muffle furnace at about 500° C. The temperature is gradually raised to 850° C. while excluding air and maintained at that temperature for 45 minutes. During this time sulfur is evolved, escapes and may be collected for re-use. The temperature is then allowed to drop to about 500° C. and held there for 3 hours, while introducing a mixture of air and sulfur dioxide. The calcined product is discharged into water, washed by decantation until substantially free of water soluble salts, wet milled in a porcelain ball mill, filtered, washed and dried.

Example 2

25.0 pounds commercial sodium aluminate
24.4 pounds diatomaceous earth
19 pounds anhydrous sodium acetate
1.5 pounds sodium resinate
78 pounds purely ground sulfur are mixed in a rotating drum and the resultant product is charged into a muffle furnace that has been previously heated to 500° C. The temperature of the kiln is then gradually brought to 800° C. with the exclusion of oxygen and the process continues as in Example 1.

Example 3

The following ingredients are mixed in a tumbler for about 2 hours:

24.3 pounds commercial sodium aluminate
25.1 pounds diatomaceous earth
25.0 pounds sodium citrate (commercial grade)
78.0 pounds powdered sulfur
1.5 pounds sodium stearate The resulting powder is then charged into a cold furnace and the temperature gradually raised to 850° C. and held at that temperature for 1 hour and the remaining steps are the same as Example 1.

Example 4

27.0 pounds of potassium aluminate
24.4 pounds of commercial silica
20 pounds of potassium acetate
1.5 pounds of potassium stearate
78 pounds of sulfur are mixed in a rotating drum for a 3 hour period. The resulting powder is then charged into a furnace at 500° C. and the steps of Example 1 are repeated here.

Example 5

A mixture is prepared by tumbling for 3 hours in a porcelain mill the following ingredients:

25.5 pounds of silica
25.0 pounds of commercial sodium aluminate
56 pounds of sodium stearate
312.0 pounds of finely ground sulfur The batch is then charged into a muffle furnace at 500° C. and the remaining steps are continued as in Example 1.

Example 6

25.5 pounds silica
25.0 pounds commercial sodium aluminate
20 pounds anhydrous finely ground sodium carbonate
120 pounds powdered sulfur
20.5 pounds rosin are thoroughly mixed in a porcelain mill and charged into a muffle furnace at 500° C. and the remaining steps follow the procedure of Example 1.

Example 7

A mixture is prepared by tumbling the following ingredients for 5 hours:

28.0 pounds potassium aluminate
23.6 pounds diatomaceous earth
170.0 pounds elemental sulfur
30.0 pounds anhydrous potassium carbonate
22.0 pounds rosin The mixture is then discharged into a pelleting machine. The resulting pellets are transferred to a muffle furnace and heated gradually to 850° C. and held at that temperature for 2 hours. During this time the sulfur escapes and is collected for re-use, the remaining steps are the same as in Example 1.

Example 8

22.5 pounds silica
25.0 pounds commercial sodium aluminate
12 pounds sodium monosulfide $9H_2O$
120 pounds powdered sulfur
1.5 pounds sodium resinate are mixed in a tumbler for 6 hours and then the batch is discharged into a muffle furnace at 500° C. and the remaining steps are the same as in Example 1.

Example 9

21.0 pounds silica
25.0 pounds commercial sodium aluminate
20 pounds commercial sodium polysulfide
78 pounds of powdered sulfur
1.5 pounds of sodium resinate are mixed in a revolving drum for 4 hours and then the batch is charged into a muffle furnace at 500° C. The process from this point follows Example 1.

Example 10

The mixture prepared in Example 1 was heated as before at 850° C. under non-oxidizing conditions for 45 minutes. Instead of allowing the temperature to drop, it was maintained at 850° C. for one-half hour while sulfur dioxide passed through the muffle. The calcined product was washed and ground as before.

Example 11

Example 1 was again repeated with the employment of sulfur dioxide only during the oxidation reaction at 500° C.

Example 12

The mixture prepared for Example 1 was charged into a muffle at 500° C. brought slowly to 800° C. and held there with exclusion of air for two hours. Without dropping the temperature, air was admitted for one and one-half hours. The calcined mass is then finished as in Example 1.

It is obvious that my invention is susceptible of extensive variation beyond the scope of the foregoing examples and accordingly I desire to be limited only as defined in my claims which follow.

I claim:

1. The method of making an ultramarine blue which comprises preparing an intimate mixture in proportions sufficient to produce an ultramarine blue, of an alkali metal salt of an aliphatic carboxy acid, rosin, sulfur, an alkali aluminate and silica, heating the mixture under reducing conditions between 600° C. and 900° C. for about three hours, and continuing the heating under oxidizing conditions between 500° C. to 850° C. for at least one-half hour, cooling, washing and grinding the product to pigment particle size.

2. The method of making an ultramarine blue which comprises preparing an intimate mixture in proportions sufficient to produce an ultramarine blue, of sodium sulfide, sulfur, sodium aluminate and silica, heating the mixture under reducing conditions to between 750° C. and 900° C. for twenty minutes to three hours, and continuing the heating under oxidizing conditions between 500° C. to 600° C. and in the presence of oxides of sulfur for at least one hour, cooling and washing the product.

3. The method of making an ultramarine blue which comprises preparing an intimate mixture in proportions sufficient to produce ultramarine blue, of a sodium salt of an aliphatic carboxy acid, sulfur, sodium aluminate and acid washed diatomaceous earth, heating the mixture under reducing conditions to about 850° C. for about three hours, cooling to about 500° C. and continuing the heating under oxidizing conditions for at least one-half hour, cooling and washing the product.

4. The method of making an ultramarine blue which comprises preparing an intimate mixture in proportions sufficient to produce an ultramarine blue, of a sodium salt of an aliphatic carboxy acid, sulfur, sodium aluminate and finely divided silica in the proportions of 2.4 to 2.8 parts of silica to alumina on a molecular basis, heating the mixture to about 850° C. under reducing conditions for up to three hours, cooling to about 500° C. and continuing the heating under oxidizing conditions for one-half to three hours, cooling, washing and grinding the product.

5. The method of making an ultramarine blue which comprises preparing an intimate mixture in proportions sufficient to produce an ultramarine blue, of an alkali metal salt of an aliphatic carboxy acid, sulfur, sodium aluminate, acid washed finely divided silica in the proportions of 2.0 to 3.0 parts of silica to one part of alumina on a molecular basis, heating the mixture to between 750° C. and 900° C. under reducing conditions for about one hour and continuing the heating between 500° C. to 600° C. under oxidizing conditions and in the presence of oxides of sulfur for at least one-half hour, cooling, washing and grinding the product.

6. The method of making an ultramarine blue which comprises preparing an intimate mixture in proportions sufficient to produce an ultramarine blue, of a sodium salt of an aliphatic carboxy acid, sulfur, sodium aluminate and diatomaceous earth, heating the mixture to between 750° to 900° C. under reducing conditions for about one hour, cooling to between 500° C. to 600° C. and continuing the heating under oxidizing conditions and in the presence of oxides of sulfur for at least one hour, cooling and washing the resultant product.

7. The method of making an ultramarine blue which comprises preparing an intimate mixture in proportions sufficient to produce an ultramarine blue, of sodium acetate, sulfur, sodium aluminate and silica, heating the mixture under reducing conditions to between 750° C. and 900° C. from one-half to three hours, cooling to between 500° C. to 600° C. and continuing the heating under oxidizing conditions and in the presence of oxides of sulfur from one-half to three hours, cooling, washing and grinding the resultant product.

8. The method of making an ultramarine blue which comprises preparing an intimate mixture in proportions sufficient to produce an ultramarine blue, of sodium acetate, sulfur, sodium aluminate and finely divided silica in the proportions of 2.4 to 2.8 parts of silica and one part of alumina on a molecular basis, heating the mixture under reducing conditions to between 750° C. and 900° C. from twenty minutes to three hours, cooling to about 500° C. and continuing the heating under oxidizing conditions and in the presence of oxides of sulfur for about three hours, cooling and washing the resultant product.

9. The method of making an ultramarine blue which comprises preparing an intimate mixture in proportions sufficient to produce an ultramarine blue, of sodium acetate, sulfur, sodium aluminate and finely divided acid washed silica in the proportions of 2.0 to 3.0 parts of silica on a molecular basis, heating the mixture under reducing conditions to between 750° C. and 900° C. for about one hour, cooling to between 500° C. to 600° C. and continuing the heating under oxidizing conditions and in the presence of oxides of sulfur for about three hours, cooling and washing the resultant product.

10. The method of making an ultramarine blue which comprises preparing an intimate mixture in proportions sufficient to produce an ultramarine blue, of sodium acetate, sulfur, sodium aluminate and finely divided acid washed silica in the proportion of 2.4 to 2.8 parts of silica to one part of alumina on a molecular basis, heating the mixture to about 850° C. under reducing conditions for about three hours, cooling to about 500° C. and continuing the heating under oxidizing conditions and in the presence of oxides of sulfur for from one-half to three hours, cooling, washing and grinding the resultant product to pigment particle size.

11. The method of making an ultramarine blue which comprises preparing an intimate mixture in proportions sufficient to produce an ultramarine blue, of sodium sulfide, sulfur, sodium aluminate and silica in the proportions of 2.0 to 3.0 parts of silica to one part alumina on a molecular basis, heating the mixture to 750° C. to 900° C. under reducing conditions for about one hour, cooling to 500° C. to 600° C. and continuing the heating under oxidizing conditions and in the presence of oxides of sulfur for at least one hour, cooling, washing and grinding the resultant product.

CHARLES A. KUMINS.

No references cited.